United States Patent
Lin et al.

(10) Patent No.: US 8,634,413 B2
(45) Date of Patent: Jan. 21, 2014

(54) USE OF FRAME CACHING TO IMPROVE PACKET LOSS RECOVERY

(75) Inventors: Chih-Lung Lin, Redmond, WA (US); Minghui Xia, Bellevue, WA (US); Pohsiang Hsu, Redmond, WA (US); Shankar Regunathan, Bellevue, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 11/027,294

(22) Filed: Dec. 30, 2004

(65) Prior Publication Data

US 2006/0146830 A1 Jul. 6, 2006

(51) Int. Cl.
  *H04L 12/26* (2006.01)

(52) U.S. Cl.
  USPC ..................................... 370/389; 375/240.27

(58) Field of Classification Search
  None
  See application file for complete search history.

(56) References Cited

U.S. PATENT DOCUMENTS

| | | | |
|---|---|---|---|
| 4,838,685 A | 6/1989 | Martinez et al. | |
| 4,989,087 A | 1/1991 | Pele et al. | |
| 5,049,991 A | 9/1991 | Niihara | |
| 5,093,720 A | 3/1992 | Krause et al. | |
| 5,150,209 A | 9/1992 | Baker et al. | |
| 5,175,618 A | 12/1992 | Ueda et al. | |
| 5,214,504 A | 5/1993 | Toriu et al. | |
| 5,227,878 A | 7/1993 | Puri et al. | |
| 5,255,090 A | 10/1993 | Israelsen | |
| 5,267,334 A | 11/1993 | Normille et al. | |
| 5,317,397 A | 5/1994 | Odaka et al. | |
| 5,376,968 A | 12/1994 | Wu et al. | |
| 5,412,430 A | 5/1995 | Nagata | |
| 5,412,435 A | 5/1995 | Nakajima | |
| 5,424,779 A | 6/1995 | Odaka et al. | |
| RE35,093 E | 11/1995 | Wang et al. | |
| 5,467,136 A | 11/1995 | Odaka et al. | |
| 5,469,226 A | 11/1995 | David et al. | |
| 5,477,272 A | 12/1995 | Zhang et al. | |
| 5,481,310 A | 1/1996 | Hibi | |

(Continued)

FOREIGN PATENT DOCUMENTS

| | | |
|---|---|---|
| EP | 0579319 | 1/1994 |
| EP | 0612156 | 4/1994 |

(Continued)

OTHER PUBLICATIONS

Shankar L. Regunathan, Kenneth Rose, "Multimode Video Coding for Noisy Channels", Proceedings of the 1997 International Conference on Image Processing, ICIP '97.

(Continued)

*Primary Examiner* — Chi Pham
*Assistant Examiner* — Mohammad Adhami
(74) *Attorney, Agent, or Firm* — Klarquist Sparkman, LLP

(57) ABSTRACT

Various new and non-obvious apparatus and methods for using frame caching to improve packet loss recovery are disclosed. One of the disclosed embodiments is a method for using periodical and synchronized frame caching within an encoder and its corresponding decoder. When the decoder discovers packet loss, it informs the encoder which then generates a frame based on one of the shared frames stored at both the encoder and the decoder. When the decoder receives this generated frame it can decode it using its locally cached frame.

33 Claims, 7 Drawing Sheets

(56) References Cited

U.S. PATENT DOCUMENTS

| | | |
|---|---|---|
| 5,539,663 A | 7/1996 | Agarwal |
| 5,541,594 A | 7/1996 | Huang et al. |
| 5,543,847 A | 8/1996 | Kato |
| 5,546,129 A | 8/1996 | Lee |
| 5,557,684 A | 9/1996 | Wang et al. |
| 5,579,430 A | 11/1996 | Grill et al. |
| 5,592,226 A | 1/1997 | Lee et al. |
| 5,594,504 A | 1/1997 | Ebrahimi |
| 5,598,215 A | 1/1997 | Watanabe |
| 5,598,216 A | 1/1997 | Lee |
| 5,612,743 A | 3/1997 | Lee |
| 5,612,744 A | 3/1997 | Lee |
| 5,617,145 A | 4/1997 | Huang et al. |
| 5,619,281 A | 4/1997 | Jung |
| 5,621,660 A | 4/1997 | Chaddha et al. |
| 5,627,591 A | 5/1997 | Lee |
| 5,642,166 A | 6/1997 | Shin et al. |
| 5,668,608 A | 9/1997 | Lee |
| 5,673,339 A | 9/1997 | Lee |
| 5,692,063 A | 11/1997 | Lee et al. |
| 5,699,476 A | 12/1997 | Van Der Meer |
| 5,714,952 A | 2/1998 | Wada |
| 5,731,850 A | 3/1998 | Maturi et al. |
| 5,740,310 A | 4/1998 | De Haan et al. |
| 5,742,344 A | 4/1998 | Odaka et al. |
| 5,748,121 A | 5/1998 | Romriell |
| 5,751,360 A | 5/1998 | Tanaka |
| 5,754,233 A | 5/1998 | Takashima |
| 5,784,107 A | 7/1998 | Takahashi |
| 5,784,175 A | 7/1998 | Lee |
| 5,784,528 A | 7/1998 | Yamane et al. |
| 5,822,541 A | 10/1998 | Nonomura et al. |
| 5,825,421 A | 10/1998 | Tan |
| 5,835,144 A | 11/1998 | Matsumura et al. |
| 5,835,149 A | 11/1998 | Astle |
| RE36,015 E | 12/1998 | Iu |
| 5,852,664 A | 12/1998 | Iverson et al. |
| 5,861,919 A | 1/1999 | Perkins et al. |
| 5,867,230 A | 2/1999 | Wang et al. |
| 5,870,148 A | 2/1999 | Lillevold |
| 5,880,784 A | 3/1999 | Lillevold |
| 5,903,313 A | 5/1999 | Tucker et al. |
| 5,905,542 A | 5/1999 | Linzer |
| 5,946,043 A | 8/1999 | Lee et al. |
| 5,949,489 A | 9/1999 | Nishikawa et al. |
| 5,963,258 A | 10/1999 | Nishikawa et al. |
| 5,970,173 A | 10/1999 | Lee et al. |
| 5,970,175 A | 10/1999 | Nishikawa et al. |
| 5,982,438 A | 11/1999 | Lin et al. |
| 5,986,713 A | 11/1999 | Odaka et al. |
| 5,990,960 A | 11/1999 | Murakami et al. |
| 5,991,447 A | 11/1999 | Eifrig et al. |
| 5,991,464 A | 11/1999 | Hsu et al. |
| 6,002,439 A | 12/1999 | Murakami et al. |
| 6,002,440 A | 12/1999 | Dalby et al. |
| RE36,507 E | 1/2000 | Iu |
| 6,011,596 A | 1/2000 | Burl et al. |
| 6,026,195 A | 2/2000 | Eifrig et al. |
| 6,029,126 A | 2/2000 | Malvar |
| 6,052,150 A | 4/2000 | Kikuchi |
| 6,052,417 A | 4/2000 | Fujiwara et al. |
| 6,057,832 A | 5/2000 | Lev et al. |
| 6,057,884 A | 5/2000 | Chen et al. |
| 6,097,759 A | 8/2000 | Murakami et al. |
| 6,104,754 A | 8/2000 | Chujoh et al. |
| 6,104,757 A | 8/2000 | Rhee |
| 6,122,321 A | 9/2000 | Sazzad et al. |
| 6,188,794 B1 | 2/2001 | Nishikawa et al. |
| 6,212,236 B1 | 4/2001 | Nishida et al. |
| 6,243,497 B1 | 6/2001 | Chiang et al. |
| 6,249,318 B1 | 6/2001 | Girod et al. |
| 6,289,054 B1 * | 9/2001 | Rhee ...................... 375/240.27 |
| 6,307,973 B2 | 10/2001 | Nishikawa et al. |
| 6,324,216 B1 | 11/2001 | Igarashi et al. |
| 6,370,276 B2 | 4/2002 | Boon |
| 6,373,895 B2 | 4/2002 | Saunders et al. |
| 6,400,990 B1 | 6/2002 | Silvian |
| 6,404,813 B1 | 6/2002 | Haskell et al. |
| 6,408,029 B1 | 6/2002 | McVeigh et al. |
| 6,415,055 B1 | 7/2002 | Kato |
| 6,415,326 B1 | 7/2002 | Gupta et al. |
| 6,418,166 B1 | 7/2002 | Lin et al. |
| 6,421,387 B1 * | 7/2002 | Rhee ...................... 375/240.27 |
| 6,441,754 B1 | 8/2002 | Wang et al. |
| 6,499,060 B1 | 12/2002 | Wang et al. |
| 6,560,284 B1 | 5/2003 | Girod et al. |
| 6,563,953 B2 | 5/2003 | Lin et al. |
| 6,625,215 B1 | 9/2003 | Faryar et al. |
| 6,629,318 B1 * | 9/2003 | Radha et al. ................ 725/134 |
| 6,640,145 B2 | 10/2003 | Hoffberg et al. |
| 6,704,360 B2 | 3/2004 | Haskell et al. |
| 6,735,345 B2 | 5/2004 | Lin et al. |
| 6,765,963 B2 * | 7/2004 | Karczewicz et al. ..... 375/240.03 |
| 6,807,231 B1 | 10/2004 | Wiegand et al. |
| 6,907,460 B2 * | 6/2005 | Loguinov et al. ............ 709/224 |
| 6,912,584 B2 | 6/2005 | Wang et al. |
| 7,006,881 B1 | 2/2006 | Hoffberg et al. |
| 7,012,893 B2 * | 3/2006 | Bahadiroglu ................ 370/231 |
| 7,124,333 B2 * | 10/2006 | Fukushima et al. .......... 714/701 |
| 7,203,184 B2 * | 4/2007 | Ido et al. ........................ 370/349 |
| 7,242,716 B2 | 7/2007 | Koto et al. |
| 7,320,099 B2 * | 1/2008 | Miura et al. ................ 714/748 |
| 7,512,698 B1 | 3/2009 | Pawson |
| 7,545,863 B1 | 6/2009 | Haskell et al. |
| 7,827,458 B1 * | 11/2010 | Salsbury et al. .............. 714/748 |
| 2002/0034256 A1 | 3/2002 | Talluri et al. |
| 2002/0097800 A1 | 7/2002 | Ramanzin |
| 2002/0105909 A1 * | 8/2002 | Flanagan et al. ............. 370/230 |
| 2002/0113898 A1 | 8/2002 | Mitsuhashi |
| 2002/0114391 A1 | 8/2002 | Yagasaki et al. |
| 2002/0126754 A1 | 9/2002 | Shen et al. |
| 2003/0099292 A1 | 5/2003 | Wang et al. |
| 2003/0138150 A1 | 7/2003 | Srinivasan |
| 2003/0156648 A1 | 8/2003 | Holcomb et al. |
| 2003/0179745 A1 * | 9/2003 | Tsutsumi et al. ............. 370/352 |
| 2003/0202586 A1 | 10/2003 | Jeon |
| 2004/0013308 A1 | 1/2004 | Jeon et al. |
| 2004/0066848 A1 | 4/2004 | Jeon et al. |
| 2004/0110499 A1 * | 6/2004 | Kang et al. ................. 455/422.1 |
| 2004/0131267 A1 | 7/2004 | Adiletta et al. |
| 2004/0233992 A1 | 11/2004 | Base et al. |
| 2005/0123274 A1 | 6/2005 | Crinon et al. |
| 2005/0135484 A1 | 6/2005 | Lee et al. |
| 2005/0147167 A1 | 7/2005 | Dumitras et al. |
| 2005/0193311 A1 | 9/2005 | Das et al. |
| 2005/0286542 A1 * | 12/2005 | Shores et al. ................ 370/401 |
| 2006/0120464 A1 * | 6/2006 | Hannuksela ............. 375/240.27 |
| 2006/0140281 A1 * | 6/2006 | Nagai et al. ............. 375/240.28 |
| 2006/0210181 A1 | 9/2006 | Wu et al. |
| 2007/0009044 A1 | 1/2007 | Tourapis et al. |
| 2007/0205928 A1 | 9/2007 | Chujoh et al. |
| 2008/0151881 A1 * | 6/2008 | Liu et al. ...................... 370/389 |

FOREIGN PATENT DOCUMENTS

| | | |
|---|---|---|
| EP | 0614318 | 9/1994 |
| EP | 0707425 | 10/1994 |
| EP | 0625853 | 11/1994 |
| JP | 5130595 | 5/1993 |
| JP | 6030394 | 2/1994 |
| JP | 6078298 | 3/1994 |
| JP | 09-149421 | 6/1997 |
| JP | 10-079949 | 3/1998 |
| JP | 10164600 | 6/1998 |
| JP | 11-027645 | 1/1999 |
| JP | 11150731 | 6/1999 |
| JP | 2000152247 | 5/2000 |
| JP | 2002-010265 | 1/2002 |
| JP | 2002-185958 | 6/2002 |
| JP | 2003-264837 | 9/2003 |
| JP | 2003-284078 | 10/2003 |
| JP | 2004-254195 | 9/2004 |
| WO | WO 91/11782 | 8/1991 |

(56) References Cited

FOREIGN PATENT DOCUMENTS

| | | |
|---|---|---|
| WO | WO 97/05746 | 2/1997 |
| WO | WO 01/35650 | 5/2001 |
| WO | WO 01/84732 A1 | 11/2001 |

OTHER PUBLICATIONS

Kenneth Rose, Shankar L. Regunathan, "Towards Optimal Scalability in Predictive Video Coding", IEEE 1998.
Rui Zhang, Shankar L. Regunathan, Kenneth Rose, "Robust Video Coding for Packet Networks with Feedback", Proceedings of the Conference on Data Compression 2000, Mar. 28-30, 2000.
Pohsiang Hsu and K. J. Ray Liu, "Software Optimization of Video Codecs on Pentium Processor With Mmx Technology", Revised May 3, 2001.
Rui Zhang, Shankar L. Regunathan and Kenneth Rose, "Optimal Estimation for Error Concealment in Scalable Video Coding", Signal Processing: Image Communication, vol. 16, (No. 8), Elsevier, p. 725-32, May 2001.
European Search Report dated Mar. 17, 2006, from the European Patent Office.
Kim, Jong Won et al., "TCP-Friendly Internet Video Streaming Employing Variable Frame-Rate Encoding and Interpolation," IEEE Transactions on Circuits and Systems for Video Technology, vol. 10, No. 7, Oct. 2000, pp. 1164-1177.
Wu, Dapeng et al., "On End-to-End Architecture for Transporting MPEG-4 Video Over the Internet," IEEE Transactions on Circuits and Systems for Video Technology, vol. 10, No. 6, Sep. 2000, pp. 923-941.
Curcio, Igor D. D. & Leon, David, "Application Rate Adaptation for Mobile Streaming," Sixth IEEE International Symposium, 2005, 6 pages.
Kim, Jong-Ok et al., "Network Adaptive Packet Scheduling for Streaming Video over Error-prone Networks," IEEE 2004, pp. 241-246.
European Search Report for EP10168516.2, dated Oct. 1, 2010, 8 pages.
Karczewicz et al., The SP- and SI-Frames Design for H.264/AVC, IEEE Trans. on Circuits and Systems for Video Technology 13:637-644 (2003).
Kurçeren et al., Synchronization-Predictive Coding for Video Compression: The SP Frames Design for JVT/H.26L, Proc. of the Int'l Conf. on Trans Image Processing 497-500 (2002).
Karczewicz et al., "A Proposal for SP-frames," VCEG-L27, 9 pp. (Jan. 2001).
Kurceren et al., "SP-frame demonstrations," VCEG-N42, 4 pp. (Sep. 2001).
Melanson, "VP3 Bitstream Format and Decoding Process," v0.5, 21 pp. (document marked Dec. 8, 2004).
On2 Technologies Inc., "On2 Introduces TrueMotion VP3.2," 1 pp., press release dated Aug. 16, 2000 (downloaded from the World Wide Web on Dec. 6, 2012).
Sullivan et al., "Meeting Report of the Twelfth Meeting of the ITU-T Video Coding Experts Group," VCEG-L46, 43 pp. (Jan. 2001).
Wiegand, "H.26L Test Model Long-Term No. 9 (TML-9) draft 0," ITU—Telecommunications Standardization Sector, Study Group 16, VCEG-N83, 74 pp. (Dec. 2001).
Wikipedia, "Theora," 10 pp. (downloaded from the World Wide Web on Dec. 6, 2012).
Wikipedia, "VP3," 4 pp. (downloaded from the World Wide Web on Dec. 6, 2012).
Xiph.org Foundation, "Theora I Specification," 206 pp. (Sep. 17, 2004).
Xiph.org Foundation, "Theora Specification," 206 pp. (Aug. 5, 2009).
Notice of Rejection (English Translation) for Japanese Application No. 2005-375508, dated Jun. 28, 2011, 3 pages.
Notice of Final Rejection (English Translation) for Japanese Application No. 2005-375508, dated Jan. 27, 2012, 3 pages.
Notice of Allowance(English Translation) for Japanese Application No. 2005-375508, dated Jul. 10, 2012, 6 pages.
Notice of First Office Action for China Application No. 200510128750.8, dated Feb. 27, 2009, 10 pages.
Notice of Second Office Action for China Application No. 200510128750.8, dated Aug. 28, 2009, 15 pages.
Notice of Third Office Action for China Application No. 200510128750.8, dated Oct. 8, 2010, 9 pages.
Notice of First Office Action for China Application No. 201110120376.2, dated Dec. 23, 2011, 6 pages.
Notice of Rejection for Japan Patent Application No. 2011-285905, dated Jul. 9, 2013, 3 pages.
Borgwardt, "Core Experiment on Interlaced Video Coding," ITU Study Group 16 Question 16, VCEG-N85, 10 pp. (Oct. 2001).
Chang et al., "Next Generation Content Representation, Creation, and Searching for New-Media Applications in Education," Proc. IEEE, vol. 86, No. 5, pp. 884-904 (1998).
Cote et al., "Effects of Standard-compliant Macroblock Intra Refresh on Rate-distortion Performance," ITU-T, Study Group 16, Question 15, 2 pp. (Jul. 1998).
"DivX Multi Standard Video Encoder," 2 pp. (Downloaded from the World Wide Web on Jan. 24, 2006).
Farber et al., "Robust H.263 Compatible Video Transmission for Mobile Access to Video Servers," Proc. Int. Conf. Image Processing, 4 pp. (1997).
Gibson et al., Digital Compression of Multimedia, Chapter 10, "Multimedia Conferencing Standards," pp. 309-362 (1998).
Gibson et al., Digital Compression of Multimedia, Chapter 11, "MPEG Compression," pp. 363-418 (1998).
Golomb, "Run-Length Encodings," 12 IEEETrans. On Info. Theory, pp. 399-401, Jul. 1966.
Hotter, "Optimization and Efficiency of an Object-Oriented Analysis—Synthesis Coder," IEEE Transactions on Circuits and Systems for Video Technology, vol. 2, pp. 181-194 (Apr. 1994).
IBM Technical Disclosure Bulletin, "Method to Deliver Scalable Video Across a Distributed Computer Systems," vol. 37, No. 5, pp. 251-256 (1997).
Irani et al., "Video Indexing Based on Mosaic Representations," Proc. IEEE, vol. 86, No. 5, pp. 905-921 (May 1998).
International Search Report, Application No. PCT/US04/29034, 4 pages, Oct. 21, 2008.
Written Opinion, Application No. PCT/US04/29034, 7 pages, Oct. 21, 2008.
ISO/IEC, 11172-2, "Information Technology—Coding of Moving Pictures and Associated Audio for Digital Storage Media at up to about 1.5 Mbit/s—Part 2: Video," pp. i-ix and 1-113 (Aug. 1993).
ISO/IEC JTC1/SC29/WG11, "Information Technology—Coding of Audio Visual Objects: Visual, ISO/IEC 14496-2," pp. vii-xiii, 14-23, 30-37, and 192-225 (Mar. 1998).
ISO/IEC JTC1/SC29/WG11, N2459, "Overview of the MPEG-4 Standard," (Oct. 1998).
ISO/IEC, "JTC1/SC29/WG11 N2202, Information Technology—Coding of Audio-Visual Objects: Visual, ISO/IEC 14496-2," 329 pp. (Mar. 1998).
ISO, ISO/IEC JTC1/SC29/WG11 MPEG 97/N1642, "MPEG-4 Video Verification Model Version 7.0 3. Encoder Definition," pp. 1, 17-122, Bristol (Apr. 1997).
ITU-T, "ITU-T Recommendation H.261, video Codec for Audiovisual Sesrvices at p × 64 kbits," 25 pp. (Mar. 1993).
ITU-T, "ITU-T Recommendation H.262, Information Technology—Generic Coding of Moving Pictures and Associated Audio Information: Video," 205 pp. (Jul. 1995).
ITU-T, Draft Recommendation H.263, "Video Coding for Low Bitrate Communication," 51 pp. (Dec. 1995).
ITU-T, "ITU-T Recommendation H.263 Video Coding for Low Bit Rate Communication," 162 pp. (Feb. 1998).
Joint Video Team (JVT) of ISO/IEC MPEG & ITU-T VCEG, "Joint Final Committee Draft (JFCD) of Joint Video Specification," JVT-D157, 207 pp. (Aug. 2002).
Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002). [Note: Some Apps Cited This As "Com-

(56) References Cited

OTHER PUBLICATIONS mittee Draft of Joint Video Specification (ITU-T Recommendation H.264, ISO/IEC 14496-10 AVC)," 142 pp. (Aug. 2002)].

Kim et al., "Low-Complexity Macroblock Mode Selection for H.264/AVC Encoders," IEEE Int. Conf. on Image Processing, 4 pp. (Oct. 2004).

Lee et al., "A Layered Video Object Coding System Using Sprite and Affine Motion Model," IEEE Transactions on Circuits and Systems for Video Technology, vol. 7, No. 1, pp. 130-145 (Feb. 1997).

Le Gall, "MPEG: A Video Compression Standard for Multimedia Applications," Communications of the ACM, vol. 34, No. 4, pp. 47-58 (Apr. 1991).

Microsoft Corporation and RealNetworks, Inc., "Advanced Streaming Format (ASF) Specification," pp. 1-56 (Feb. 26, 1998).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Microsoft Corporation, "Windows Media Technologies: Overview—Technical White Paper," pp. 1-16 (Month unknown, 1998).

Mook, "Next-Gen Windows Media Player Leaks to the Web," BetaNews, 17 pp. (Jul. 2002) [Downloaded from the World Wide Web on Aug. 8, 2003].

Pennebaker et al., "JPEG Image Data Compression Standard," Chapter 20, pp. 325-329 (1993).

Regunathan et al., "Scalable video coding with robust mode selection," Signal Processing: Image Communication, vol. 16, No. 8, pp. 725-732 (May 2001).

Robin et al., Digital Television Fundamentals, pp. 393-394 (Jun. 2000).

Rui et al., "Digital Image/Video Library and MPEG-7: Standardization and Research Issues," ICASSP (1998).

Sullivan, "Draft for 'H.263++' Annexes U, V, and W to Recommendation H.263," ITU-T, Study Group 16, Question 15, 46 pp. (Nov. 2000).

Sullivan et al., "The H.264/AVC Advanced Video Coding Standard: Overview and Introduction to the Fidelity Range Extensions," 21 pp. (Aug. 2004).

Tourapis et al., "Timestamp Independent Motion Vector Prediction for P and B frames with Division Elimination," Joint Video Team (JVT) of ISO/IEC MPEG & ITU-T VCEG, JVT-D040, 4th Meeting, Klagenfurt, Austria, 18 pages, Jul. 22-26, 2002.

Wang et al., "Error Control and Concealment for Video Communication: A Review," Proc. IEEE, vol. 86, No. 5, pp. 974-997 (May 1998).

Wang et al., "Error Resilient Video Coding Techniques," IEEE Signal Processing Magazine, pp. 61-82 (Jul. 2000).

Wenger et al., "Intra-macroblock Refresh in Packet (Picture) Lossy Scenarios," ITU-T, Study Group 16, Question 15, 3 pp. (Jul. 1998).

Wenger et al., "Simulation Results for H.263+ Error Resilience Modes K, R, N on the Internet," ITU-T, Study Group 16, Question 15, 22 pp. (Apr. 1998).

Wiegand et al., "Block-Based Hybrid Coding Using Motion Compensated Long-Term Memory Prediction," Picture Coding Symposium, No. 143, pp. 153-158 (Sep. 1997).

Wiegand et al., "Fast Search for Long-Term Memory Motion-Compensated Prediction," Proc. ICIP, vol. 3, pp. 619-622 (Oct. 1998).

Wiegand et al., "Motion-Compensating Long-Term Memory Prediction," Proc. ICIP, vol. 2, pp. 53-56 (Oct. 1997).

Wiegand, "Multi-frame Motion-Compensated Prediction for Video Transmissions," Shaker Verlag, 141 pp. (Sep. 2001).

Wien, "Variable Block-Size Transforms for Hybrid Video Coding," Dissertation, 182 pp. (Feb. 2004).

Yu et al., "Two-Dimensional Motion Vector Coding for Low Bitrate Videophone Applications," Proc. Int'l Conf. on Image Processing, pp. 414-417 (1995).

\* cited by examiner

USE OF FRAME CACHING TO IMPROVE PACKET LOSS RECOVERY

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates generally to techniques for digitally encoding, decoding and processing video, images and other digital media content. The present invention relates particularly to improving packet loss recovery by frame caching.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel as a set of three samples totaling 24 bits. For instance, a pixel may comprise an 8-bit luminance sample (also called a luma sample) that defines the grayscale component of the pixel and two 8-bit chrominance sample values (also called chroma samples) that define the color component of the pixel. Thus, the number of bits per second, or bitrate, of a typical raw digital video sequence may be five million bits per second or more.

Many computers and computer networks lack the resources to process raw digital video. For this reason, engineers use compression (also called coding or encoding) to reduce the bitrate of digital video. Compression decreases the cost of storing and transmitting video by converting the video into a lower bitrate form. Decompression (also called decoding) reconstructs a version of the original video from the compressed form. A "codec" is an encoder/decoder system. Compression can be lossless, in which the quality of the video does not suffer, but decreases in the bitrate are limited by the inherent amount of variability (sometimes called entropy) of the video data. Or, compression can be lossy, in which quality of the video suffers, but achievable decreases in the bitrate are more dramatic. Lossy compression is often used in conjunction with lossless compression—in a system design in which the lossy compression establishes an approximation of information and lossless compression techniques are applied to represent the approximation.

In general, video compression techniques include "intrapicture" compression and "interpicture" compression, where a picture is, for example, a progressively scanned video frame, an interlaced video frame (having alternating lines for video fields), or an interlaced video field. Generally speaking, video sequences contain a significant amount of redundancy within a given frame, and between sequential frames. For example, the human eye generally does not notice slight differences in otherwise similar backgrounds in successive video frames. Compression exploits these redundancies by removing a certain portion of the redundant material within the bitstream being sent, and then adding them back in at the receiving end when the picture is uncompressed. Two common redundancies that are subtracted out of video frames are spatial and temporal. Spatial redundancies occur between neighboring pixels within a single frame. Frames that are compressed using spatial redundancies, known as intraframes, or I-frames, contain all of the information needed to reconstitute the image within the frame itself—they are self-contained. Frames that use temporal redundancies, such as P-frames and B-frames, require information from other frames to be decoded. P-frames (predictively encoded frames) are encoded, and must be decoded, using information from previous I- and/or P-frames. B-frames (bi-directionally predictively-encoded frames) are encoded using information from both previous and subsequent I- and P-frames. Motion estimation removes temporal redundancy in successive video frames (interframes) by encoding the unique matter along with a motion-predicted image created from a previously-encoded image known as a reference frame. If a reference frame is lost, then its succeeding predictive frames cannot be deciphered the transmission errors propagate to successive frames.

For progressive frames, intrapicture compression techniques compress individual frames (typically called I-frames or key frames), and interpicture compression techniques compress frames (typically called predicted frames, P-frames, or B-frames) with reference to preceding and/or following frames (typically called reference or anchor frames). I-frames (self-contained) and P-frames (which generally refer to preceding frames) can themselves be reference frames, while B-frames, which refer to both preceding and following frames, are typically never used as references themselves.

When the data is decompressed prior to the resulting video being displayed, a decoder typically performs the inverse of the compression operations. For example, a decoder may perform entropy decoding, inverse quantization, and an inverse transform while decompressing the data. When motion compensation is used, the decoder (and encoder) reconstruct a frame from one or more previously reconstructed frames (which are now used as reference frames), and the newly reconstructed frame may then be used as a reference frame for motion compensation for later frames.

Packets sent through networks are subject to loss—packets are dropped. This loss occurs randomly and unpredictably. Furthermore, video compression stream data is highly sensitive to delay; as the packets need to be reassembled in the same order that they were sent; too many delayed packets give rise to a jumpy, interrupted signal. Transmission delay problems can also occur in resending a new I-frame; the new frame is susceptible to all of the same problems that corrupted the lost reference frame. Furthermore, in lossy coding schemes, the compression is designed to meet a target bit-rate for storage and transmission. High compression is achieved by lowering the quality of the reconstituted image. Therefore, any extra loss caused by dropped or delayed packets may degrade the image below an acceptable rate. The capacity to handle packet loss is crucial for real-time video codec (RTC) to perform well in noisy networks—those susceptible to loss. Most of the existing video codecs cope with packet loss by requesting a new I-frame when a reference frame is lost. Others use slice-based coding, which adds to the signaling overhead. FIG. 1 illustrates traditional packet loss recovery by requesting a new I-frame.

In this prior art method, an I-frame 104 is received at the decoder 102. It is then used to interpret/reconstruct subsequent dependent P-frame 106. The next dependent frame, P-frame 108 is corrupted, as sufficient packets are received out of order or lost. The subsequent P-frame 110 and any following frames can no longer be reconstructed. At the destination node (here represented by decoder 102) an I-frame request is generated and sent to the source node (here represented by encoder 114). Each subsequent P-frame or B-frame cannot be reconstructed until a new I-frame is received. Once the source node 114 receives the request, it assembles a new I-frame 112 and sends it to the destination node 102 using the communications channel. After receiving the new I-frame 112 the destination channel can successfully decode the subsequent P-frames. However, this results in a delay 116 equivalent to the time needed to send the initial request, plus the time to encode the I-frame, plus the time to send the I-frame to the destination node 102. Moreover, a sender and a receiver may be separated by a large amount of physical distance, with the long trip creating a noticeable lag-time with a corresponding degradation in the quality of the video.

In another prior art method, I-frames 104, 112 are sent at regular intervals. When an I-frame 112 is lost due to corruption or delay, the decoder waits until the next I-frame is received, incorrectly decoding the subsequent P-frames 110, 108, 106.

Therefore, there exists a need for improved methods and systems for transmitting compressed video over a lossy packet based network.

SUMMARY

A video codec described herein includes a frame cache at the encoder and a corresponding frame cache at the decoder, each of which can work in synchronization. A frame in the decoder cache is used to help interpret a frame at the decoder. The frame to be interpreted may have been generated using a copy of the same frame stored in the encoder cache.

A system implementation is also provided. It comprises an encoder, which encodes data packets into frames, and an encoder cache, which can store a frame or a portion of a frame. It further comprises a decoder, with a decoder cache, which can also store a frame or a portion of one. The decoder is operable to detect packet loss. When such a loss is detected, in some embodiments, the encoder encodes a frame using the frame stored at the encoder cache, which is then decoded at the decoder using the frame stored in the decoder cache.

This caching mechanism provides the following key features:

a) more efficient bandwidth utilization during packet loss recovery, and b) eliminating signaling overhead associated with slice-based coding.

Additional features and advantages of the invention will be made apparent from the following detailed description of embodiments that proceeds with reference to the accompanying drawings.

DETAILED DESCRIPTION

The following description is directed to implementations of a frame cache in both a video encoder and a video decoder, which is designed to provide an effective combination of graceful packet loss recovery and efficient bandwidth utilization. An exemplary application of the frame cache is in an image or video encoder and decoder. Accordingly, the frame cache is described in the context of a generalized image or video encoder and decoder, but alternatively, can be incorporated in the encoder and decoder of various other image and video codecs that may vary in details from this exemplary apparatus described below.

1. Generalized Video Encoder and Decoder

Figure 1:
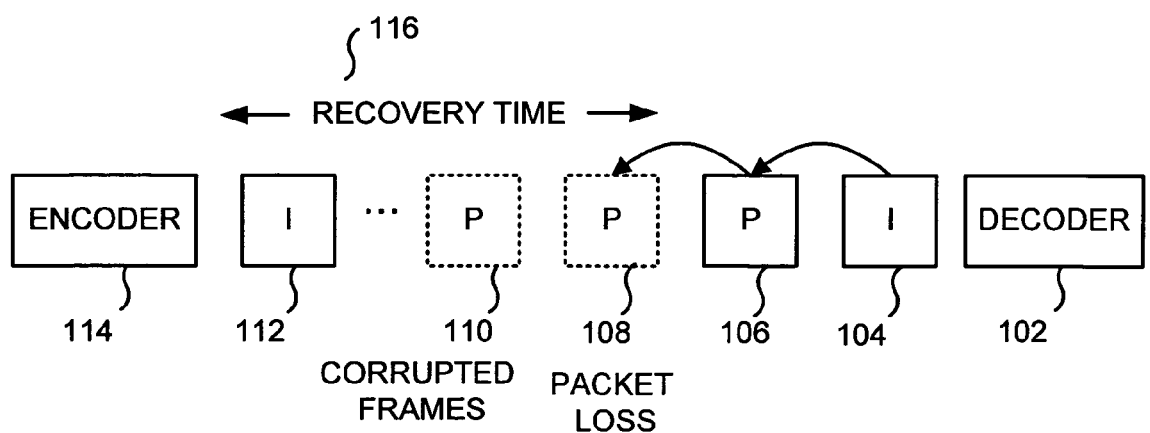
FIG. 1 is a prior art diagram of frame level packet loss recovery.
Figure 2:
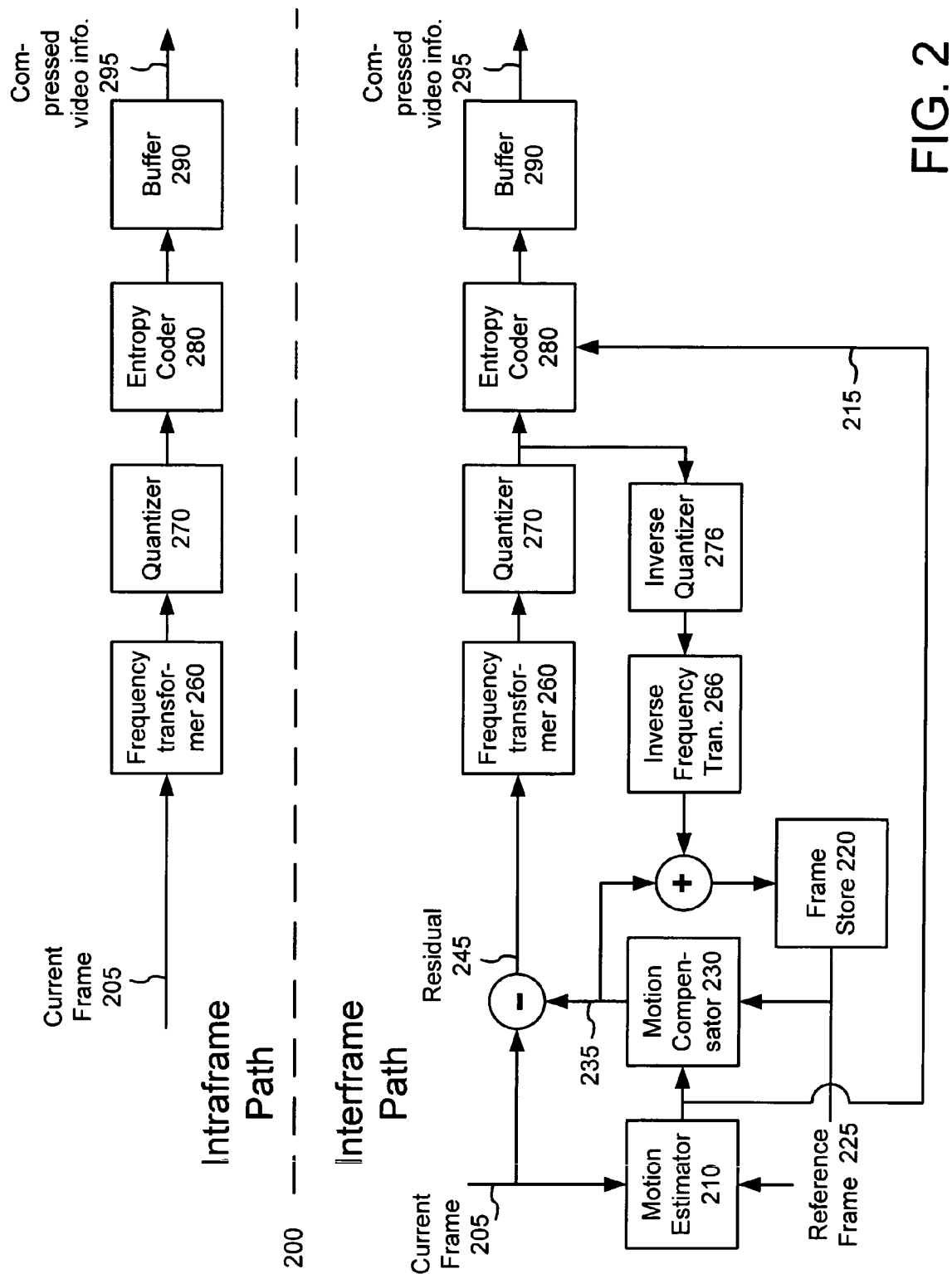
FIG. 2 is a block diagram of a video utilizing the frame caching described herein.
Figure 3:
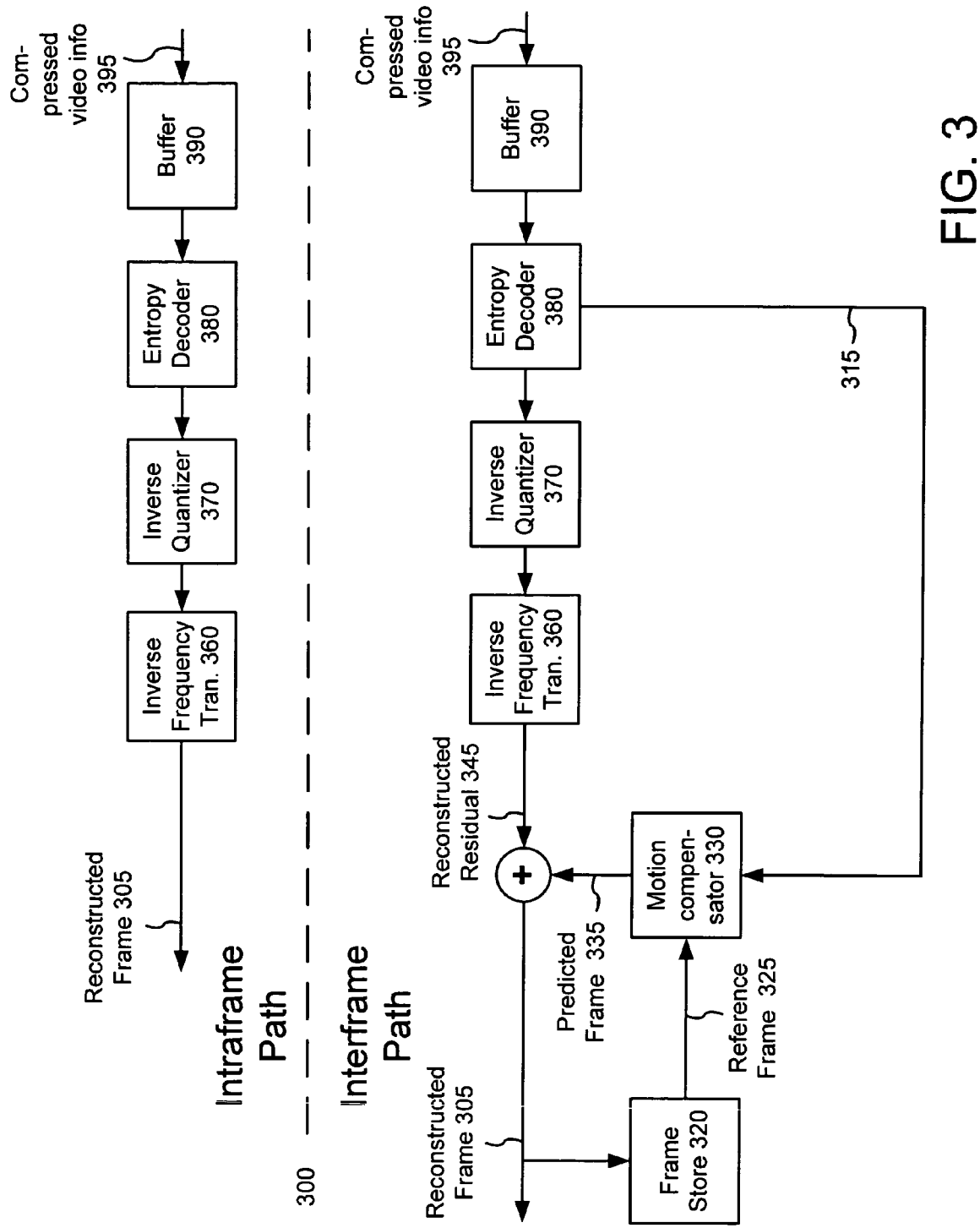
FIG. 3 is a block diagram of a video decoder utilizing the frame caching described herein.

FIG. 2 is a block diagram of a generalized video encoder 200 and FIG. 3 is a block diagram of a generalized video decoder 300, in which the frame caches can be incorporated The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

Depending on implementation and the type of compression desired, modules of the encoder 200 or decoder 300 can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a general video encoder system 200. The encoder system 200 receives a sequence of video frames, including a current frame 205, and produces compressed video information 295 as output. Particular embodiments of video encoders typically use a variation or supplemented version of the generalized encoder 200.

The encoder system 200 compresses predicted frames and key frames. For the sake of presentation, FIG. 2 shows a path for key frames through the encoder system 200 and a path for forward-predicted frames. Many of the components of the encoder system 200 are used for compressing both key frames and predicted frames. The exact operations performed by those components can vary depending on the type of information being compressed.

A predicted frame [which might be a P-frame, a B-frame (bi-directional prediction), or an inter-coded frame] is represented in terms of prediction (or difference) from one or more other frames. A prediction residual is the difference between what was predicted and the original frame. In contrast, a key frame [also called an I-frame, or an intra-coded frame] is compressed without reference to other frames.

If the current frame 205 is a forward-predicted frame, a motion estimator 210 estimates motion of macroblocks or other sets of pixels of the current frame 205 with respect to a reference frame 225, which is the reconstructed previous frame buffered in the frame store 220. In alternative embodiments, the reference frame can be a later frame or the current frame can be bi-directionally predicted. The motion estimator 210 outputs as side information motion information 215, such as motion vectors. A motion compensator 230 applies the motion information 215 to the reconstructed previous frame 225 to form a motion-compensated current frame 235. The prediction is rarely perfect, however, and the difference between the motion-compensated current frame 235 and the original current frame 205 is the prediction residual 245. Alternatively, a motion estimator 210 and motion compensator 230 apply another type of motion estimation/compensation.

A frequency transformer 260 converts the spatial domain video information into frequency domain (i.e., spectral) data. For block-based video frames, the frequency transformer 260 applies a transform described in the following sections that has properties similar to the discrete cosine transform ["DCT"]. In some embodiments, the frequency transformer 260 applies a frequency transform to blocks of spatial prediction residuals for key frames. The frequency transformer 260 can apply an 8×8, 8×4, 4×8, or other size frequency transforms.

A quantizer 270 then quantizes the blocks of spectral data coefficients. The quantizer 270 applies uniform, scalar quantization to the spectral data with a step-size that varies on a frame-by-frame basis or other basis. Alternatively, the quantizer 270 applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 200 can use frame dropping, adaptive filtering, or other techniques for rate control.

When a reconstructed current frame is needed for subsequent motion estimation/compensation, an inverse quantizer 276 performs inverse quantization on the quantized spectral data coefficients. An inverse frequency transformer 266 then performs the inverse of the operations of the frequency transformer 260, producing a reconstructed prediction residual (for a predicted frame) or a reconstructed key frame. If the current frame 205 was a key frame, the reconstructed key frame is taken as the reconstructed current frame (not shown). If the current frame 205 was a predicted frame, the reconstructed prediction residual is added to the motion-compensated current frame 235 to form the reconstructed current frame. The frame store 220 buffers the reconstructed current frame for use in predicting the next frame. In some embodiments, the encoder 200 applies a deblocking filter to the reconstructed frame to adaptively smooth discontinuities in the blocks of the frame.

The entropy coder 280 compresses the output of the quantizer 270, as well as certain side information (e.g., motion information 215, quantization step size). Typical entropy coding techniques include arithmetic coding, differential coding, Huffman coding, run length coding, LZ coding, dictionary coding, and combinations of the above. The entropy coder 280 typically uses different coding techniques for different kinds of information (e.g., DC coefficients, AC coefficients, etc.), and can choose from among multiple code tables within a particular coding technique.

The entropy coder 280 puts compressed video information 295 in the buffer 290. A buffer level indicator is fed back to bitrate adaptive modules. The compressed video information 295 is depleted from the buffer 290 at a constant or relatively constant bitrate and stored for subsequent streaming at that bitrate. Alternatively, the encoder system 200 streams compressed video information 295 immediately following compression.

Before or after the buffer 290, the compressed video information 295 can be channel-coded for transmission over the network. The channel coding can apply error detection and correction data to the compressed video information 295.

B. Video Decoder

FIG. 3 is a block diagram of a general video decoder system 300. The decoder system 300 receives information 395 for a compressed sequence of video frames and produces output, including a reconstructed frame 305. Particular embodiments of video decoders typically use a variation or supplemented version of the generalized decoder 300.

The decoder system 300 decompresses predicted frames and key frames. For the sake of presentation, FIG. 3 shows a path for key frames through the decoder system 300 and a path for forward-predicted frames. Many of the components of the decoder system 300 are used for compressing both key frames and predicted frames. The exact operations performed by those components can vary depending on the type of information being compressed.

A buffer 390 receives the information 395 for the compressed video sequence and makes the received information available to the entropy decoder 380. The buffer 390 typically receives the information at a rate that is fairly constant over time, and includes a jitter buffer to smooth short-term variations in bandwidth or transmission. The buffer 390 can include a playback buffer and other buffers, as well. Alternatively, the buffer 390 receives information at a varying rate. The compressed video information 395 can be decoded and processed for error detection and correction either before it reaches the buffer 390, after it leaves the buffer 390, or both.

The entropy decoder 380 entropy decodes entropy-coded quantized data, as well as entropy-coded side information (e.g., motion information, quantization step size), typically applying the inverse of the entropy encoding performed in the encoder 200. Entropy decoding techniques include arithmetic decoding, differential decoding, Huffman decoding, run length decoding, LZ decoding, dictionary decoding, and combinations of the above. The entropy decoder 380 frequently uses different decoding techniques for different kinds of information (e.g., DC coefficients, AC coefficients, different kinds of side information), and can choose from among multiple code tables within a particular decoding technique.

If the frame 305 to be reconstructed is a forward-predicted frame, a motion compensator 330 applies motion information 315 to a reference frame 325 to form a prediction 335 of the frame 305 being reconstructed. For example, the motion compensator 330 uses a macroblock motion vector to find a macroblock in the reference frame 325. A frame buffer 320 stores previous reconstructed frames for use as reference frames. Alternatively, a motion compensator applies another type of motion compensation. The prediction by the motion compensator 330 is rarely perfect, so the decoder 300 also reconstructs prediction residuals 345.

When the decoder 300 needs a reconstructed frame for subsequent motion compensation, the frame store 320 buffers the reconstructed frame 305 for use in predicting the next frame. In some embodiments, the encoder 200 applies a deblocking filter to the reconstructed frame 305 to adaptively smooth discontinuities in the blocks of the frame.

An inverse quantizer 370 inverse quantizes entropy-decoded data. In general, the inverse quantizer 370 applies uniform, scalar inverse quantization to the entropy-decoded data with a step-size that varies on a frame-by-frame basis or other basis. Alternatively, the inverse quantizer 370 applies another type of inverse quantization to the data, for example, a non-uniform, vector, or non-adaptive quantization, or directly inverse quantizes spatial domain data in a decoder system that does not use inverse frequency transformations.

An inverse frequency transformer 360 converts the quantized, frequency domain data into spatial domain video information. For block-based video frames, the inverse frequency transformer 360 applies an inverse transform described in the following sections. In some embodiments, the inverse frequency transformer 360 applies an inverse frequency transform to blocks of spatial prediction residuals for key frames. The inverse frequency transformer 360 can apply an 8×8, 8×4, 4×8, or other size inverse frequency transforms.

C. Frame Caching

In implementations which use frame caching within a video codec architecture described herein, reference frames are cached preferably at both the encoder and decoder in sequence. When a reference frame is lost, the subsequent dependent frames can be decoded using the appropriate reference frame cached at the decoder. This produces the following benefits:

A) More efficient bandwidth utilization: Prior art methods call for an I-frame to be generated and sent to the encoder. This method allows for a special type of frame, an SP-frame, to be sent to the decoder, and then cached until needed. SP-frames can generally be coded with fewer bits than I-frames of the same quality, and therefore, use less bandwidth than using an equivalent I-frame.

B) Faster error recovery: Preferably an SP-frame is already cached at the decoder when packet loss occurs; this allows the next P-frame in the stream to be interpreted with little lag time.

2. Overview of Exemplary Methods

Described embodiments include techniques and tools for caching frames at a decoder, and then using the cached frames to reconstruct P-frames and B-frames that depend on reference frames that have been corrupted or lost. The cache can be incorporated as part of the video decoder 300 (FIG. 3), as part of the video encoder 200 (FIG. 2), or, preferably, both. When packet loss is detected by the decoder, it sends a message to the encoder 300, which then generates a new reference frame based on one of the shared cached frames. The generated reference frame is then sent to the decoder. The cached frame is used at the decoder to decode the generated frame and subsequent dependent frames until another reference frame arrives at the decoder. The flowchart elements described herein are only examples; other flowchart elements can be used in accordance with the described techniques. Furthermore, the flowchart elements can occur in different orders, or specific process blocks can be skipped in accordance with the described techniques and tools.

The described techniques and tools can be used in combination with one another or with other techniques and tools, or can be used independently.

Figure 4:
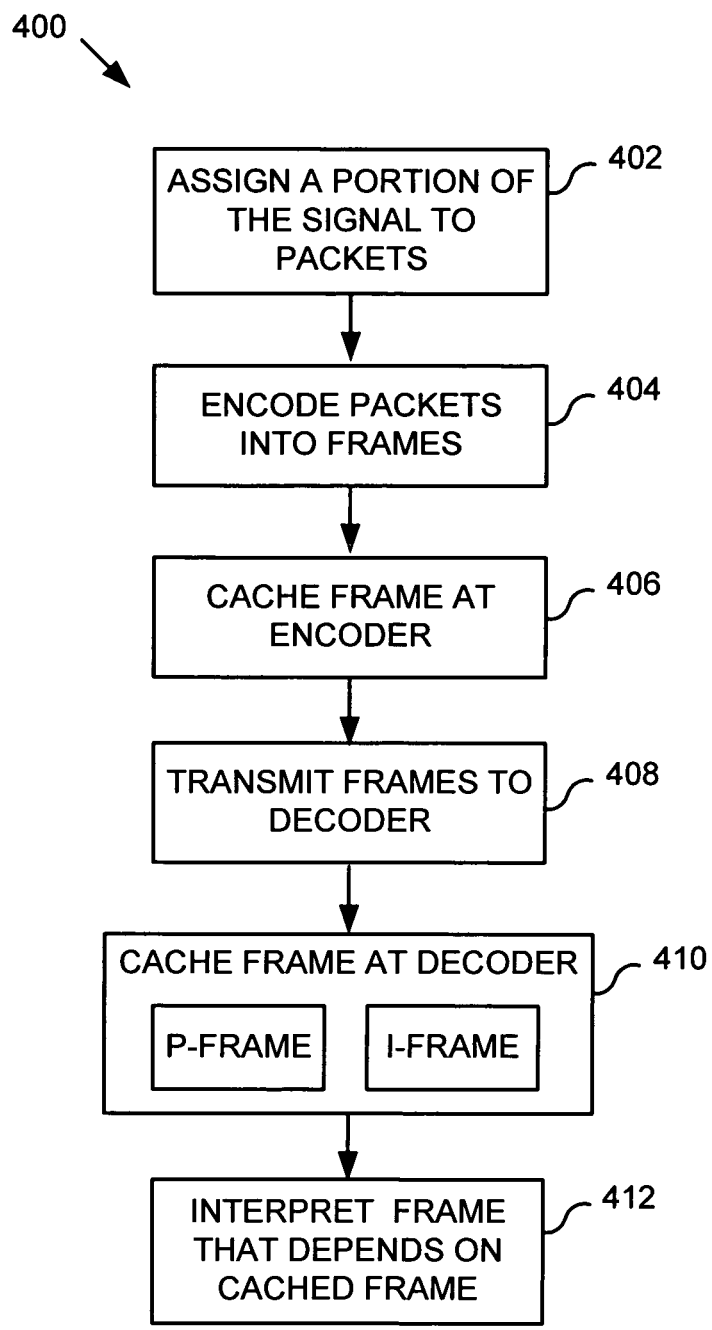
FIG. 4 is a flowchart of an exemplary method for recovering from packet loss utilizing frame caching.

Referring to FIG. 4, flowchart 400 shows a brief overview of the methods disclosed herein. At process block 402, a portion of a video signal that is to be transmitted over a network is assigned to packets. At process block 404, an encoder encodes at least a portion of the packets into frames. These frames may consist of reference frames 325, such as I-frames and P-frames, and may also consist of B-frames, which are not used as references for any other frame types. Alternate types of frames, such as skip frames, may also be encoded into frames. At optional process block 406, a frame, generally a reference frame, may be cached at the encoder. If the frame is cached, it is assigned the type "Cached-Frame" (CF) in its frame header. The frame that was cached, with other frames, is then transmitted to the decoder at process block 408. Once the frame is at the decoder, it is cached in a decoder cache at process block 410. Typical cached frame types are P-frames and I-frames.

If a subsequent reference frame is lost, then the cached frame may be used to decompress a following dependent frame, as shown at process block 412. The flowchart 400 shows only one exemplary embodiment and should not be construed as limiting in any way. For example, the cache associated with the encoder at decision block 406 is optional. The method 400 may be implemented in a video codec as is shown in FIGS. 2 and 3, which may be implemented in software, hardware, or a combination of both.

3. Exemplary Method for Caching Frames

Figure 5A:
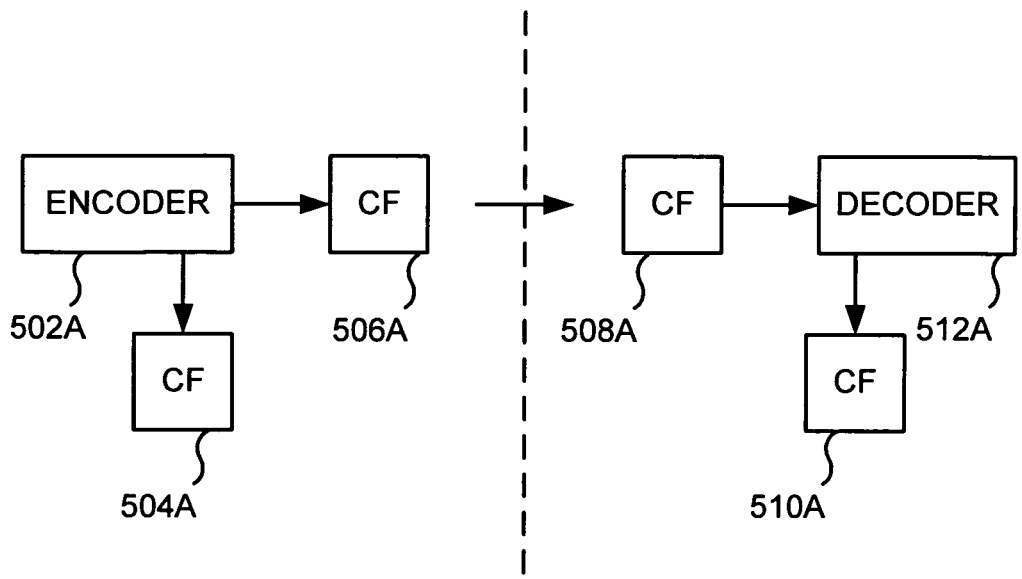
FIG. 5A is a frame-level diagram of an encoder caching a frame and a decoder caching the same frame.
Figure 5B:
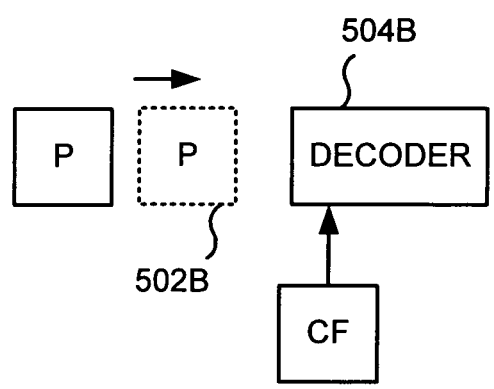
FIG. 5B is a frame-level diagram of a corrupted P-frame arriving at a decoder.
Figure 5C:
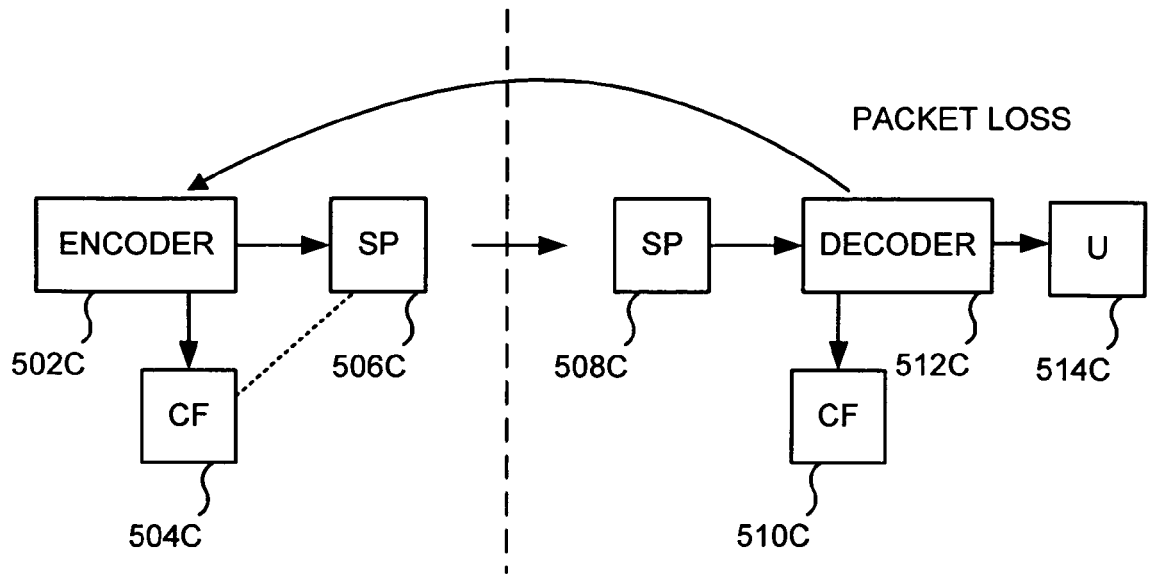
FIG. 5C is a frame-level diagram depicting the decoder using a cached frame to interpret a P-frame.
Figure 5D:
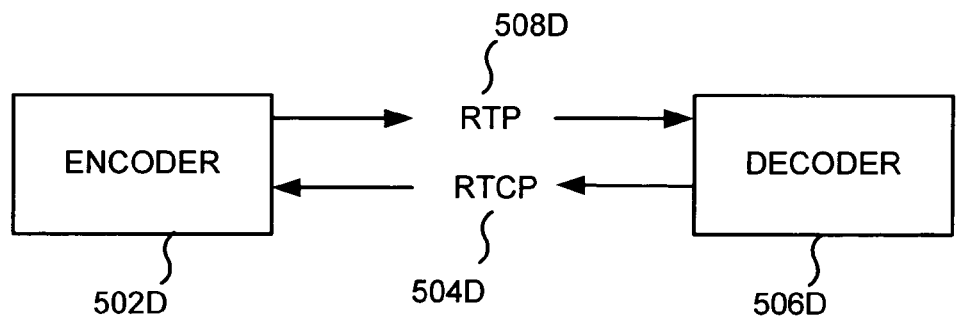
FIG. 5D is a block diagram of reporting packet loss through a feedback channel.

FIGS. 5A through 5D show an exemplary method of caching frames to enable optimum performance of video codecs in noisy networks. With reference to FIG. 5D, in an exemplary embodiment, frames are transmitted from an encoder 502D to a decoder 506D through a main channel, such as RTP (real time transport protocol) 508D. The internet often loses packets, or delivers packets out of order. Packets may also be delayed by some random amount of time, which may also make them unusable. A packet loss event is detected by the decoder 506D and signaled through a feedback channel from the decoder to the encoder 502D. To correctly reconstruct a message, in some embodiments, the RTP 508D header contains information and a sequence number that both allows the receiver to reorder packets correctly and to determine the number of packets that are being lost. The RTP 508D is augmented by its control protocol (RTPC) 504D, used to provide a feedback channel that can be used to monitor data delivery. Each data packet has a sequence number, typically incremented by one for each subsequent data packet. In an exemplary embodiment, the packet loss is detected by the decoder 506D when a sequence number is not received. Once the decoder 506D has discovered a lost packet, it sends a message through the feedback channel 504D informing the encoder 502D which packet (or packets) have been lost. In some embodiments, only information about the initial packet lost is provided. In other embodiments, additional information, such as the number of dropped packets, or a list of the specific packets lost, is also provided. The location of the packet loss is preferably transmitted using the timestamp of the earliest packet loss in the reporting window. This information enables the encoder 502D to determine which cached reference to use.

With reference to FIG. 5A, the encoder 502A periodically caches frames in a frame cache 504A. Which frames to cache, how often caching should occur, and the number of frames that should be able to be cached at a single time is highly implementation-dependent. The frames cached, in some embodiments, are reference frames, that is, P-frames and I-frames. Other frame types can also be cached. The frame that was cached 506A (or a copy thereof) is also sent to the decoder 512A. Such a frame, which is also stored in the encoder cache 504A, is defined in its header as of frame type CF (cached frame). In some embodiments, this header allows synchronization of the encoder 502A and decoder 512A by letting the decoder 512A know that this specific frame should be cached in the decoder cache 510A for later use. Table 1, below, shows an exemplary embodiment of frame type codes, including the cached frame (CF) type.

TABLE 1

Frame Type Codes

| Frame Type | Code Word (Binary) |
|---|---|
| I | 110 |
| P | 0 |
| B | 10 |
| BI | 1110 |
| SKIP | 11111 |
| SP | 111100 |
| CF | 111101 |

When the frame of type CF 508A reaches the decoder 512A, it is stored in the decoder frame cache 510A. Storing each frame of type CF at the decoder 512A is one method of synchronizing the encoder and decoder frame caches 504A and 510A. However, other methods of synchronizing these frame caches are also envisioned.

When packet loss 502B is detected at the decoder 504B, it is reported back to the encoder 502A using the feedback channel 504D. This report, preferably, contains timestamp information which allows the encoder 502A to choose the correct cached frame 504A to reference. In other embodiments, the latest cached frame is used. Once a cached frame has been chosen 504C, it is used by the encoder 502C to encode the next frame 506C, preferably a P-frame, but I-frames and other frame types can also be encoded. This frame encoded using the cached frame 506C is known as a "Super-P" frame (SP-frame) and is signaled as such in its header. An exemplary frame type code word for the SP-frame is shown in Table 1, above.

When the decoder 512C receives the SP-frame 508C, it decodes it into an uncompressed frame (U-frame) 514C using the frame cached locally 510C. Using this method, the recovery time at the decoder 512C is the interval between the packet loss event and the arrival of the SP-frame. If this generated SP-frame 508C is lost during transmission, the decoder 512C will continue sending packet loss reports until the arrival of a new reference frame (generally of type P, SP, or I). The actual recovery time from packet loss is a function, primarily, of the packet loss reporting interval.

In some implementations, the encoder 502A caches a frame 504A and sends a copy of the cached frame 506A to the decoder periodically. The length of time between cached frames being sent is highly implementation-dependent. Some implementations may cache the frames at equal intervals. Other implementations may cache the frames at intervals which are themselves dependent upon system variables such as the speed of the network or the amount of loss the network is experiencing.

4. Exemplary System Embodiment

Figure 6:
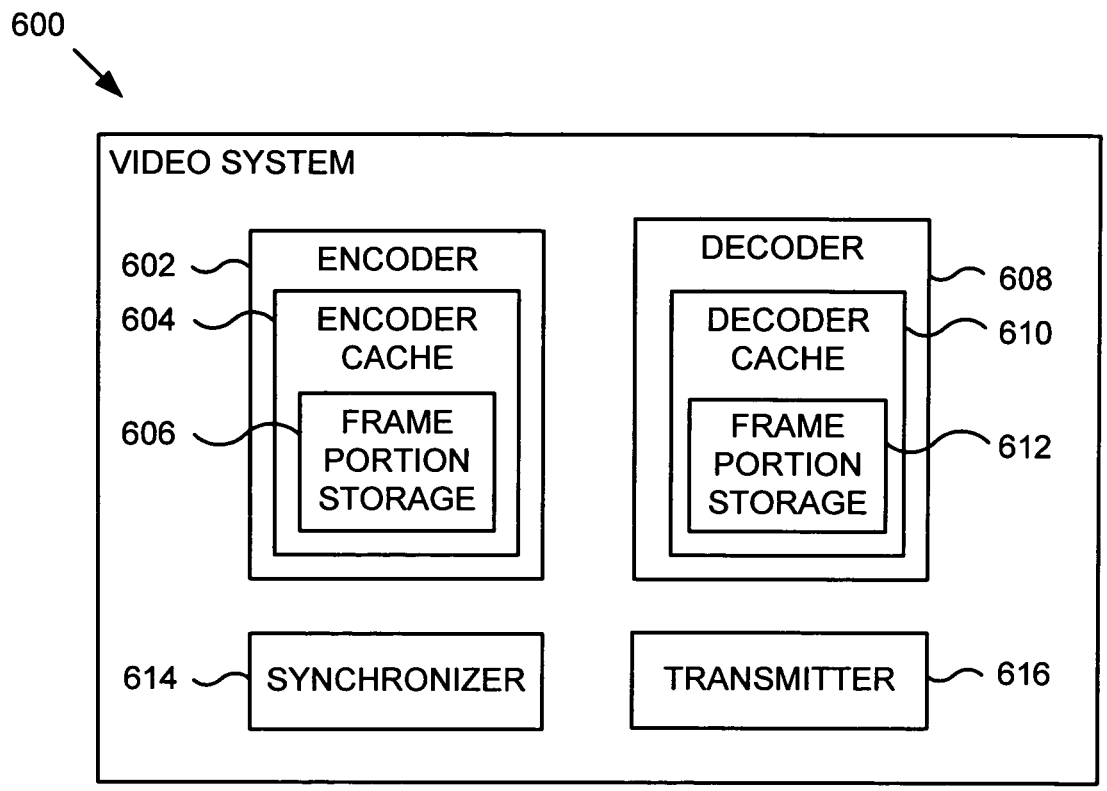
FIG. 6 is a flowchart of a suitable method for implementing video encoder/decoder caching.

FIG. 6 illustrates another exemplary embodiment of a video system 600 that can be used to implement decoder- and encoder-based frame caching. The video system 600 is not intended to suggest any limitation as to scope of use or functionality of the invention, as the present invention may be implemented in diverse general- or special-purpose video systems.

The video system contains at least one encoder 602. This encoder further comprises an encoder cache 604. In the illustrated embodiment, the cache resides within the encoder 602, but in other implementations may reside elsewhere within the video system. The encoder cache 604 is enabled to store one or more sections of video frames 606. By way of suggestion and not limitation, these sections of frames may consist of a number of blocks, macroblocks, a number of slices, entire frames, groups of frames, or any other division of frames that can be envisioned by one of skill in the art. The encoder cache 604 may cache only one frame portion, may cache two portions, or any number of portions that might be desirable for a given implementation. The video system 600 also comprises a decoder 608. Similar to the encoder 602, the decoder 608 contains a decoder cache 610, which is used to store one or more portions of video frames 612. These video frame portions may comprise of one or more blocks, macroblocks, slices, or may comprise entire frames, groups of frames, or other division of frame that can be envisioned by one of skill in the art. The decoder cache 610 may be set up to store one frame portion, two frame portions, or any other number of frame portions.

The video system 600 also comprises a synchronizer 614, which is used to ensure that the encoder cache 604 and the decoder cache 610 contain substantially similar information. As discussed previously, the synchronizer may comprise a unique frame header attached to certain frames or portions of frames, applied by the encoder 602, that inform the decoder 608 that a specific frame or portion of a frame is to be cached. For example, a frame may be stored at the encoder cache 604 and also sent to the decoder 608. That frame may have a distinctive CF (Cached Frame) header to indicate that there is a copy of it stored in the encoder cache 604. When the decoder 608 detects packet loss or other corruption that makes decoding a frame difficult or impossible, the subsequent frame encoded by the encoder 602 from the frame stored in the encoder cache 604 may be marked to indicate that this frame can be decoded from a frame at the decoder cache 610. Some implementations may have multiple frames stored at the decoder cache 610; in such a case, the header may also optionally contain sufficient other information to determine which cached frame should be used. Other methods of synchronization are also envisioned. A transmitter 616 transmits the frames from the encoder 602 to the decoder 608.

5. Computing Environment

The above described implementations of frame caching can be performed on any of a variety of devices in which image and video signal processing is performed, including among other examples, computers, image and video recording, transmission and receiving equipment, portable video players video conferencing, web video streaming applications, etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 7.

Figure 7:
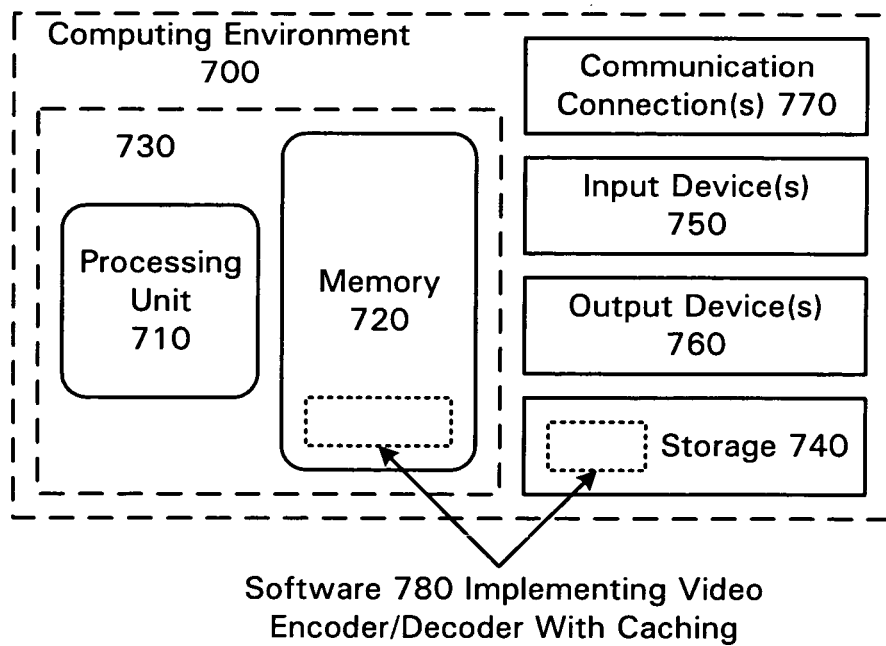
FIG. 7 is a block diagram of a suitable computing environment for the video encoder/decoder of FIGS. 2 and 3.

FIG. 7 illustrates a generalized example of a suitable computing environment 700 in which the described frame caching may be implemented. The computing environment 700 is not intended to suggest any limitation as to scope of use or functionality of the invention, as the present invention may be implemented in diverse general- or special-purpose computing environments.

The computing environment 700 includes at least one processing unit 710 and memory 720. This most basic configuration 730 is included within a dashed line. The processing unit 710 executes computer-executable instructions and may be a real or virtual processor. In a multi-processing system, multiple processing units execute computer-executable instructions to increase processing power. The memory 720 may be volatile memory (e.g., registers, cache, RAM, etc.), non-volatile memory (e.g., ROM, EEPROM, flash memory, etc.), or some combination of the two. The memory 720 stores software 780 implementing the described encoder/decoder caching.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium that can be used to store information and can be accessed within the computing environment 700. The storage 740 stores instructions for the software 780 implementing the encoder/decoder caching scheme.

The input device(s) 750 may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information, such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The encoder/decoder frame caching techniques herein can be described in the general context of computer-readable media. Computer-readable media are any available media that can be accessed within a computing environment 700. By way of example, and not limitation, with the computing environment 700, computer-readable media include memory 720, storage 740, and combinations of any of the above.

The encoder/decoder frame caching herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine", "transmit", "encode", "decode", and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of decoding a signal transmitted over a network, comprising:
   receiving, at a decoder, a compressed stream containing a sequence of encoded frames comprising key frames and predicted frames, the key frames having been intra-coded, the predicted frames having been encoded using motion-compensated predictive encoding with reference to respective one or more reference frames, at least some of the encoded frames having code elements designating said frames that have the code elements to be a cached frame corresponding to a frame cached at the encoder;
   upon receiving any frame designated to be a cached frame, retaining temporarily said any designated frame in a frame cache, at the decoder;
   with said any designated frame retained in the frame cache at the decoder, detecting packet loss affecting a subsequent one of the encoded frames sent to the decoder;
   with the decoder, sending a packet loss detection signal to the encoder indicating that packet loss has been detected;
   in response to the packet loss detection, the decoder receiving, from the encoder, a generated frame having been encoded by the encoder using motion-compensated inter-picture compression encoding with reference to said frame cached at the encoder as a substitute frame for the frame affected by the packet loss, the generated frame being marked to indicate that the generated frame can be decoded from said any designated frame retained in the frame cache at the decoder;
   with the decoder, decoding the generated frame with reference to said any designated frame retained in the frame cache at the decoder which corresponds to the frame cached at the encoder; and
   with the decoder, producing a reconstructed frame sequence with an uncompressed frame based at least in part on said decoding of the generated frame.

2. The method of claim 1, wherein the method further comprises periodically receiving and retaining frames designated to be a cached frame in the frame cache at the decoder.

3. The method of claim 2, wherein said periodically receiving occurs at a set interval.

4. The method of claim 1, wherein the packet loss has a time associated with it and wherein a timestamp representing the packet loss time is sent to the encoder.

5. The method of claim 1, wherein the encoder receives the packet loss detection signal, and upon receipt of the packet loss detection signal, encodes the generated frame using motion-compensated inter-picture compression encoding with reference to the frame cached at the encoder.

6. The method of claim 5, wherein the substitute frame further comprises a frame header and wherein the substitute frame is distinctively named in the frame header.

7. The method of claim 1, wherein the signal is an image signal, a video signal, an audio signal, or a speech signal.

8. A computer-readable storage device or memory storing computer-executable instructions for causing a computer system to perform a method comprising:
    receiving, at a decoder, a compressed stream containing a sequence of encoded frames comprising key frames and predicted frames, the key frames having been intra-coded, the predicted frames having been encoded using motion-compensated predictive encoding with reference to respective one or more reference frames, at least some of the encoded frames having code elements designating said frames that have the code elements to be a cached frame corresponding to a frame cached at the encoder;
    upon receiving any frame designated to be a cached frame, retaining temporarily said any designated frame in a frame cache, at the decoder;
    with said any designated frame retained in the frame cache at the decoder, detecting packet loss affecting a subsequent one of the encoded frames sent to the decoder;
    with the decoder, sending a packet loss detection signal to the encoder indicating that packet loss has been detected;
    in response to the packet loss detection, the decoder receiving, from the encoder, a generated frame having been encoded by the encoder using motion-compensated inter-picture compression encoding with reference to said frame cached at the encoder as a substitute frame for the frame affected by the packet loss, the generated frame being marked to indicate that the generated frame can be decoded from said any designated frame retained in the frame cache at the decoder;
    with the decoder, decoding the generated frame with reference to said any designated frame retained in the frame cache at the decoder which corresponds to the frame cached at the encoder; and
    with the decoder, producing a reconstructed frame sequence with an uncompressed frame based at least in part on said decoding of the generated frame.

9. A system of streaming video within a lossy network comprising:
    a decoder operable to receive data packets for a compressed stream containing a sequence of encoded frames comprising key frames and predicted frames from an encoder, the key frames having been intra-coded, the predicted frames having been encoded using motion-compensated predictive encoding with reference to respective one or more reference frames, at least some of the encoded frames having code elements designating said frames that have the code elements to be a cached frame corresponding to a frame cached at the encoder;
    a frame cache at the decoder;
    the decoder operable upon receiving any frame designated to be a cached frame from the encoder to retain said any designated frame in the frame cache;
    the decoder operable to decode the key frames received from the encoder; the decoder operable to decode the motion-compensated predicted frames received from the encoder with reference to their respective reference frames;
    the decoder being operable to detect packet loss that affects a subsequent one of the encoded frames; and upon such detection, operable to signal said packet loss to the encoder and receive back from the encoder in response a generated frame having been encoded by the encoder using motion-compensated inter-picture compression encoding with respect to the frame cached at the encoder as replacement for the frame affected by the packet loss, the generated frame being marked to indicate that the generated frame can be decoded from said any designated frame retained in the frame cache at the decoder; and
    upon receipt of said generated frame from the encoder, the decoder operable to decode the generated frame with reference to the frame retained in the frame cache at the decoder, and to reconstruct a sequence of frames decoded from the compressed stream having an uncompressed frame based at least in part on said decoding of the generated frame.

10. The system of claim 9, further comprising a synchronizer which synchronizes the frame cached at the encoder with the frame retained in the frame cache in the decoder.

11. A video processor, comprising:
    a decoder with a frame cache, operable to retain a copy of a frame designated for caching in the frame cache and transmitted to the decoder from an encoder;
    the decoder operable to receive data packets for a compressed stream containing a sequence of encoded frames comprising key frames and predicted frames from an encoder, the key frames having been intra-coded, the predicted frames having been encoded using motion-compensated predictive encoding with reference to respective one or more reference frames, at least some of the encoded frames having code elements designating said frames that have the code elements as corresponding to a frame cached at the encoder for caching in the frame cache;
    the decoder operable to decode the key frames, and to decode the predicted frames with reference to their respective one or more reference frames;
    the decoder operable to retain temporarily said any designated frame in a frame cache;
    the decoder operable to detect packet loss that affects a subsequent frame during transmission from the encoder;
    the decoder operable to transmit location of the packet loss to the encoder;
    the decoder operable to receive from the encoder in response to the transmitted location of the packet loss a generated frame designated with a header code as having been encoded by the encoder using motion-compensated inter-picture compression encoding with reference to the frame cached at the encoder as a replacement for the frame affected by the packet loss;
    the decoder operable to decode the generated frame designated with the header code as a replacement frame with reference to the copy of the frame retained in the frame cache of the decoder; and
    the decoder operable to reconstruct a sequence of frames decoded from the compressed stream.

12. The method of claim 1, wherein the packet loss detection signal is sent periodically by the decoder until the arrival of a new key frame at the decoder.

13. The method of claim 1, further comprising the decoder decoding any frames designated as generated frames and received from the encoder following said frame having packet loss using the frame retained in the frame cache at the decoder until receipt of a next frame designated to be a cached frame.

14. The method of claim 1, wherein the frame cache holds multiple frames.

15. The system of claim 9, wherein the decoder is operable to receive multiple generated frames from the encoder in response to detecting packet loss in frames, and decode said generated frames with reference to the frame retained in the frame cache in the decoder cache until another frame designated to be a cached frame is received.

16. The system of claim 9, wherein the decoder is operable to transmit location of the packet loss to the encoder using a timestamp of earliest detected packet loss.

17. The method of claim 1, wherein if the generated frame is not received by the decoder, then the decoder continues sending packet loss reports until arrival of a new key frame.

18. The method of claim 1, wherein the decoding the generated frame includes:
arithmetic decoding encoded transform coefficients and encoded side information;
inverse quantizing the transform coefficients to produce dequantized transform coefficients;
inverse frequency transforming the dequantized transform coefficients to produce residual values;
performing motion compensation to produce motion-compensated prediction values using motion information and the frame retained in the frame cache at the decoder;
combining the motion-compensated prediction values with the residual values; and performing deblock filtering.

19. The method of claim 1, wherein the frame cache at the decoder is updated according to information in frame headers that indicates which of the frames is to be stored in the frame cache at the decoder, and wherein the frame cache at the decoder is also updated to store a current frame of the frames for use as a reference frame in decoding a next frame of the frames.

20. The method of claim 19, wherein information that indicates the current frame is to be stored in the frame cache for use as a reference frame is signaled in a frame header for the current frame as part of frame type.

21. The method of claim 1, wherein the compressed stream is received over a real-time transport protocol channel, and wherein the packet loss detection signal is transmitted over a real-time control protocol channel.

22. The computer-readable storage device or memory of claim 8, wherein the method further comprises periodically receiving and retaining frames designated to be a cached frame in the frame cache at the decoder.

23. The computer-readable storage device or memory of claim 8, wherein the packet loss has a time associated with it and wherein a timestamp representing the packet loss time is sent to the encoder.

24. The computer-readable storage device or memory of claim 8, wherein the encoder receives the packet loss detection signal, and upon receipt of the packet loss detection signal, encodes the generated frame using motion-compensated inter-picture compression encoding with reference to the frame cached at the encoder.

25. The computer-readable storage device or memory of claim 8, wherein the packet loss detection signal is sent periodically by the decoder until the arrival of a new key frame at the decoder.

26. The computer-readable storage device or memory of claim 8, wherein the method further comprises the decoder decoding any frames designated as generated frames and received from the encoder following said frame having packet loss using the frame retained in the frame cache at the decoder until receipt of a next frame designated to be a cached frame.

27. The computer-readable storage device or memory of claim 8, wherein the frame cache holds multiple frames.

28. The computer-readable storage device or memory of claim 8, wherein the method further comprises: if the generated frame is not received by the decoder, then the decoder continues sending packet loss reports until arrival of a new key frame.

29. The computer-readable storage device or memory of claim 8, wherein the decoding the generated frame includes:
arithmetic decoding encoded transform coefficients and encoded side information;
inverse quantizing the transform coefficients to produce dequantized transform coefficients;
inverse frequency transforming the dequantized transform coefficients to produce residual values;
performing motion compensation to produce motion-compensated prediction values using motion information and the frame retained in the frame cache at the decoder;
combining the motion-compensated prediction values with the residual values; and
performing deblock filtering.

30. The computer-readable storage device or memory of claim 8, wherein the frame cache at the decoder is updated according to information in frame headers that indicates which of the frames is to be stored in the frame cache at the decoder, and wherein the frame cache at the decoder is also updated to store a current frame of the frames for use as a reference frame in decoding a next frame of the frames.

31. The video processor of claim 11, further comprising a synchronizer which synchronizes the frame cached at the encoder with the frame retained in the frame cache in the decoder.

32. The video processor of claim 11, wherein the decoder is operable to receive multiple generated frames from the encoder in response to detecting packet loss in frames, and decode said generated frames with reference to the frame retained in the frame cache in the decoder cache until another frame designated to be a cached frame is received.

33. The video processor of claim 11, wherein the decoder is operable to transmit location of the packet loss to the encoder using a timestamp of earliest detected packet loss.

* * * * *